US009504308B2

(12) United States Patent
Wood

(10) Patent No.: US 9,504,308 B2
(45) Date of Patent: Nov. 29, 2016

(54) FLUID RESERVOIR SHELL

(71) Applicant: Leonard B. Wood, Waddell, AZ (US)

(72) Inventor: Leonard B. Wood, Waddell, AZ (US)

( * ) Notice: Subject to any disclaimer, the term of this patent is extended or adjusted under 35 U.S.C. 154(b) by 142 days.

(21) Appl. No.: 14/339,252

(22) Filed: Jul. 23, 2014

(65) Prior Publication Data
US 2014/0331476 A1 Nov. 13, 2014

Related U.S. Application Data

(63) Continuation of application No. 13/627,673, filed on Sep. 26, 2012, now Pat. No. 8,820,579.

(60) Provisional application No. 61/626,500, filed on Sep. 28, 2011.

(51) Int. Cl.
*A45F 3/18* (2006.01)
*A45F 3/20* (2006.01)
*A45F 3/16* (2006.01)
*B23P 19/04* (2006.01)

(52) U.S. Cl.
CPC . *A45F 3/18* (2013.01); *A45F 3/20* (2013.01); *B23P 19/04* (2013.01); *A45F 2003/166* (2013.01); *A45F 2200/0583* (2013.01); *Y10T 29/49826* (2015.01); *Y10T 29/49876* (2015.01); *Y10T 29/49877* (2015.01); *Y10T 29/49879* (2015.01); *Y10T 29/49893* (2015.01)

(58) Field of Classification Search
CPC ...... A45F 3/18; A45F 3/20; A45F 2003/166; A45F 2200/0583; B23P 19/04; Y10T 29/49826; Y10T 29/49876; Y10T 29/49877; Y10T 29/49879; Y10T 29/49893; B65D 77/06; B65D 77/065; B65D 81/3233; B67D 1/0462; B67D 2001/0827; B05B 11/0043; A45F 3/16

USPC ............ 29/453, 454, 455.1, 463, 452; 224/148.1, 148.2; 222/175, 478, 481, 222/482, 105, 106, 608, 92, 94, 173; 220/475

See application file for complete search history.

(56) References Cited

U.S. PATENT DOCUMENTS

| 2,777,610 | A | * | 1/1957 | Fox | F16N 5/00 222/130 |
| 3,523,645 | A | * | 8/1970 | Beauchamp | A01M 29/12 222/175 |
| 4,815,635 | A | * | 3/1989 | Porter | B62J 11/00 222/136 |
| 5,060,833 | A | * | 10/1991 | Edison | A45F 5/00 215/388 |
| 5,284,481 | A | * | 2/1994 | Soika | A61M 5/152 206/370 |
| 5,370,278 | A | * | 12/1994 | Raynie | A63H 33/00 222/144.5 |
| 5,474,212 | A | * | 12/1995 | Ichikawa | B05B 11/0043 222/105 |
| 5,595,325 | A | * | 1/1997 | Leres | B67D 3/00 222/135 |
| 5,730,327 | A | * | 3/1998 | Stern | A47K 5/1209 222/105 |

(Continued)

Primary Examiner — Christopher Besler
Assistant Examiner — Bayan Salone
(74) Attorney, Agent, or Firm — Schmeiser, Olsen & Watts LLP

(57) ABSTRACT

Disclosed is a fluid reservoir shell that provides protection for the fluid reservoir of a personal hydration system. The fluid reservoir shell is rigid and does not collapse easily under external pressure. The fluid reservoir shell is sized to contain the fluid reservoir but still fits in a personal hydration system pack. The shell protects the fluid reservoir and prevents the fluid reservoir from leaking due to excessive external pressure. The fluid reservoir shell disclosed includes a shell top piece and a shell bottom piece, which couple together to enclose the bladder of the fluid reservoir. The fluid reservoir shell provides ready access to the fill port and the drink tube of the fluid reservoir when the fluid reservoir is contained in the fluid reservoir shell.

15 Claims, 14 Drawing Sheets

(56) References Cited

U.S. PATENT DOCUMENTS

| | | | | |
|---|---|---|---|---|
| 5,984,145 A * | 11/1999 | McAllister | A45F 3/16 | 222/175 |
| 6,142,344 A * | 11/2000 | Kai | B65D 75/5883 | 222/105 |
| 6,247,619 B1 * | 6/2001 | Gill | A45F 3/20 | 222/105 |
| 6,409,048 B1 * | 6/2002 | Belzeski | A45F 3/20 | 222/103 |
| 6,454,132 B2 * | 9/2002 | Campion | A45C 11/22 | 222/105 |
| 6,510,965 B1 * | 1/2003 | Decottignies | B05B 11/0043 | 222/105 |
| 6,574,985 B2 * | 6/2003 | Fiore, Jr. | A45F 3/18 | 62/457.4 |
| 6,619,505 B1 * | 9/2003 | Decottignies | B05B 11/0043 | 222/105 |
| 6,675,998 B2 * | 1/2004 | Forsman | B65D 77/28 | 215/306 |
| 6,802,435 B1 * | 10/2004 | Brawner, Jr. | F41B 9/0078 | 222/175 |
| 6,820,780 B2 * | 11/2004 | Forsman | B65D 77/28 | 215/306 |
| 7,073,688 B2 * | 7/2006 | Choi | F16L 37/0841 | 141/379 |
| 7,121,431 B2 * | 10/2006 | Duke | B65D 75/5883 | 222/183 |
| 7,201,299 B2 * | 4/2007 | Forsman | A45F 3/14 | 224/148.2 |
| 7,600,656 B2 * | 10/2009 | Karl | A45F 3/18 | 222/175 |
| 7,762,432 B2 * | 7/2010 | Fidrych | A45F 3/04 | 222/175 |
| 8,167,174 B2 * | 5/2012 | Berger | A45F 3/04 | 206/219 |
| 8,807,377 B2 * | 8/2014 | Corbett | B65D 77/06 | 215/12.1 |
| 8,820,579 B2 * | 9/2014 | Wood | A45F 3/18 | 222/105 |
| 2004/0000570 A1 * | 1/2004 | Forsman | A45F 3/047 | 224/579 |
| 2008/0067202 A1 * | 3/2008 | Silva | A41D 13/01 | 224/148.2 |
| 2010/0065584 A1 * | 3/2010 | Berger | A45F 3/04 | 222/145.5 |
| 2010/0123019 A1 * | 5/2010 | Zehavi | A45F 3/18 | 239/33 |
| 2011/0036846 A1 * | 2/2011 | Corbett | B65D 77/06 | 220/495.03 |
| 2011/0220652 A1 * | 9/2011 | Corbett | B65D 77/06 | 220/495.03 |

* cited by examiner

Bottom View

FLUID RESERVOIR SHELL

CROSS REFERENCE TO RELATED APPLICATION

This application claims priority to U.S. application Ser. No. 13/627,673, to Leonard B. Wood, filed Sep. 26, 2012 and entitled "Fluid Reservoir Shell", which claims priority to U.S. Provisional Patent Application Ser. No. 61/626,500, filed Sep. 28, 2011, by Leonard B. Wood and entitled "Universal Armor", which are incorporated herein by reference in their entirety.

BACKGROUND OF THE INVENTION

Technical Field

This invention relates to personal hydration systems and in particular to a rigid shell for enclosing the fluid reservoir of a personal hydration system.

State of the Art

Personal hydration systems have become widely popular as a means to supply water and other fluids to individuals. Personal hydration systems often include a fluid reservoir and a pack for carrying the fluid reservoir. The fluid reservoir includes a flexible bladder that can be filled with drinking fluids through a fill port, and a fill port cap for sealing the fill port so the fluids cannot escape the bladder. The fluids are removed from the fluid reservoir through a drink tube attached to the bladder. The drink tube can be used to suck fluids from the bladder into the mouth by the user of the personal hydration system. The fluid reservoir is often contained in a flexible pack that can be worn on the body of the user like a backpack.

Personal hydration systems are popular with individuals involved in outdoor sports, outdoor work, or other activities in which it is desirable to have ready access to drinking fluids without having to carry a drink container with the hands. A drawback with these personal hydration systems is that both the fluid reservoir and the pack are flexible and can be collapsed from external pressure. Thus, individuals who are involved in specific tasks or sports are finding that their personal hydration systems are failing as a result of receiving too much external pressure. For example, mountain bikers, backpackers and other outdoor sports enthusiasts are finding that a fall which puts external pressure on the personal hydration system will cause the fill port to leak and the fluid contained in the bladder to leak out, emptying the personal hydration system of its contents and rendering the system useless. Similarly, fireman, policemen, and other individuals involved in extreme condition tasks are having their personal hydration systems fail when the fluid reservoir receives too much external pressure.

Accordingly, what is needed is a personal hydration system in which the fill port and the bladder do not leak or fail when the personal hydration system receives external pressure. This document discloses a fluid reservoir shell that protects the bladder of the personal hydration system from external pressure, allows easy access to the fill port and drink tube of the fluid reservoir, fits within the personal hydration system pack, and keeps the fluid reservoir from leaking or failing when the fluid reservoir receives external pressure.

DISCLOSURE OF THE INVENTION

This invention relates to personal hydration systems and in particular to a rigid shell for enclosing the fluid reservoir of a personal hydration system.

Disclosed is a method of forming a fluid reservoir shell. The method of forming a fluid reservoir shell includes forming a shell top piece of a rigid material, where the shell top piece comprises a fill port opening, and wherein a fluid reservoir couples to the shell top piece such that a fill port of the fluid reservoir protrudes from the fill port opening. The method of forming the fluid reservoir shell also includes forming a shell bottom piece of a rigid material, where the shell bottom piece couples to the shell top piece; where the shell top piece and the shell bottom piece enclose a bladder of the fluid reservoir in response to the fluid reservoir being coupled to the shell top piece and the shell bottom piece being coupled to the shell top piece. In some embodiments the shell bottom piece comprises two drink tube ports. In some embodiments the two drink tube ports are placed at a shell bottom piece top end.

In some embodiments the shell top piece includes a tongue running along a perimeter of the shell top piece, the shell bottom piece includes a groove running along a perimeter of the shell bottom piece; and the tongue extends into the groove in response to the shell bottom piece being coupled to the shell top piece.

In some embodiments the method of forming a fluid reservoir shell includes forming a drink tube port at a shell bottom piece top end; and running a drink tube along an inside of the fluid reservoir shell from a shell bottom piece bottom end to the drink tube port.

Disclosed is a method of forming a fluid reservoir shell that includes forming a shell top piece of a rigid material, where the shell top piece includes a fill port opening, and where a fluid reservoir couples to the shell top piece such that a fill port of the fluid reservoir protrudes from the fill port opening. The method also includes forming a shell bottom piece of a rigid material, where the shell bottom piece couples to the shell top piece, and where the shell top piece and the shell bottom piece enclose a bladder of the fluid reservoir in response to the fluid reservoir being coupled to the shell top piece and the shell bottom piece being coupled to the shell top piece. The method also includes running a drink tube along an inside of the fluid reservoir shell from a shell bottom piece bottom end to a drink port located at a shell bottom piece top end.

Disclosed is a method of forming a a fluid reservoir shell that includes forming a shell top piece of a rigid material, where the shell top piece comprises a fill port opening, and where a fluid reservoir separably couples to the shell top piece such that a fill port of the fluid reservoir protrudes from the fill port opening. The method also includes forming a shell bottom piece of a rigid material, where the shell bottom piece separably couples to the shell top piece, and where the shell top piece and the shell bottom piece enclose a bladder of the fluid reservoir in response to the fluid reservoir being coupled to the shell top piece and the shell bottom piece being coupled to the shell top piece. In some embodiments the shell top piece includes a tongue running along a perimeter of the shell top piece at least partially on all sides, the shell bottom piece comprises a groove running along a perimeter of the shell bottom piece at least partially on all sides, and the tongue extends into the groove in response to the shell bottom piece being coupled to the shell top piece. In some embodiments the method includes running a drink tube along an inside of the fluid reservoir shell from a shell bottom piece bottom end to a drink port located at a shell bottom piece top end. In some embodiments the shell bottom piece comprises two drink tube ports, and the two drink tube ports are placed at a shell bottom piece top end.

Disclosed is a personal hydration system according to the invention that includes a fluid reservoir and a fluid reservoir shell comprised of a rigid material. The fluid reservoir shell contains the fluid reservoir. The personal hydration system also includes a pack comprised of a flexible material, where the pack contains the fluid reservoir shell. In some embodiments of the personal hydration system according to the invention the fluid reservoir shell provides access to a fill port and a drink tube in response to the fluid reservoir shell enclosing the fluid reservoir. In some embodiments the fluid reservoir shell includes a shell top piece, where the shell top piece comprises a fill port opening; and a shell bottom piece, where the shell bottom piece comprises one or more than one drink tube port. The shell top piece and the shell bottom piece removeably and repeatably couple together.

In some embodiments the fill port opening is located at a shell top piece top end. In some embodiments the fill port removeably couples to the fill port opening. In some embodiments the shell bottom piece comprises two drink tube ports, where the two drink tube ports are located side-by-side at a shell bottom piece top end. In some embodiments the shell bottom piece includes two reinforcing ridges, where each of the two reinforcing ridges extend longitudinally between the two drink ports. In some embodiments the shell top piece includes a top tab coupler, where the top tab coupler comprises a tab coupler hole. In some embodiments the shell bottom piece comprises a bottom tab coupler, where the bottom tab coupler comprises a tab coupler tooth. In some embodiments the shell top piece is coupled to the shell bottom piece in response to the tab coupler tooth extending into the tab coupler hole.

Disclosed is a fluid reservoir shell according to the invention, the fluid reservoir shell including a shell top piece formed of a rigid material, where the shell top piece comprises a fill port opening. A fluid reservoir couples to the shell top piece such that a fill port of the fluid reservoir protrudes from the fill port opening. The fluid reservoir shell according to the invention also includes a shell bottom piece formed of a rigid material, wherein the shell bottom piece couples to the shell top piece. The shell top piece and the shell bottom piece enclose a bladder of the fluid reservoir in response to the fluid reservoir being coupled to the shell top piece, and the shell bottom piece being coupled to the shell top piece. In some embodiments the shell bottom piece includes a bottom tab coupler, where the bottom tab coupler includes a tab coupler tooth. In some embodiments the shell top piece includes a top tab coupler, where the top tab coupler includes a tab coupler hole. In some embodiments the shell top piece includes a tab coupler slot, where the tab coupler slot receives the bottom tab coupler. In some embodiments the shell bottom piece couples to the shell top piece in response to the tab coupler slot receiving the bottom tab coupler and the tab coupler tooth extending into the tab coupler hole.

In some embodiments of the fluid reservoir shell according to the invention, the shell top piece includes a tongue running along a portion of a perimeter of the shell top piece. In some embodiments the shell bottom piece comprises a groove running along a portion of the perimeter of the shell bottom piece, and the tongue extends into the groove in response to the shell bottom piece being coupled to the shell top piece. In some embodiments of the fluid reservoir shell according to the invention, the fluid reservoir couples to the shell top piece such that the fill port and a fill port cap of the fluid reservoir are accessible from an exterior of the fluid reservoir shell, and wherein the bladder is contained in an interior of the fluid reservoir shell. In some embodiments of the fluid reservoir shell according to the invention, the shell bottom piece comprises a drink tube port, where the drink tube port is placed at a shell bottom piece top end.

Disclosed is a method of forming a fluid reservoir shell that encloses a bladder of a personal hydration system according to the invention. The method of forming a fluid reservoir shell that encloses a bladder of a personal hydration system according to the invention includes the steps of forming a shell top piece from a rigid material; and forming a shell bottom piece from a rigid material, wherein the shell top piece and the shell bottom piece couple together to enclose the bladder. In some embodiments the method includes the step of forming a fill port opening in the shell top piece, where the fill port opening couples to a fill port of the fluid reservoir. In some embodiments the method includes the step of forming a drink tube port in the shell bottom piece, where a drink tube of the fluid reservoir extends through the drink tube port.

In some embodiments the step of forming a fill port opening in the shell top piece includes the step of placing the fill port opening at a shell top piece top end. In some embodiments the step of forming a drink tube port in the shell bottom piece comprises the step of placing two drink tube ports at a shell bottom piece top end opposite the fill port opening in the shell top piece. In some embodiments the step of forming a shell bottom piece comprises the step of forming a pair of reinforcing ridges between the two drink tube ports in the shell bottom piece. In some embodiments the step of forming a shell top piece comprises the step of forming a drink tube dome in a shell top piece bottom end, wherein the drink tube dome protects a drink tube coupler of the bladder in response to the fluid reservoir being contained in the fluid reservoir shell.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

As discussed above, embodiments of the present invention relate to personal hydration systems and in particular to a rigid shell for enclosing the fluid reservoir of a personal hydration system. Personal hydration systems are popular with individuals involved in outdoor sports, outdoor work, or other activities in which it is desirable to have ready access to drinking fluids without having to carry a drink container with the hands. A drawback with these personal hydration systems is that both the fluid reservoir and the pack are flexible and can be collapsed as a result of too much external pressure being applied to the outer surface of the fluid reservoir. Thus individuals who are involved in specific tasks or sports are finding that their personal hydration systems are failing as a result of too much external pressure. For example, mountain bikers are finding that a fall which puts external pressure on the personal hydration system will cause the fill port to leak and the fluid contained in the bladder to leak out, emptying the personal hydration system of its contents and rendering the system useless. Similarly, fireman, policemen, and other individuals involved in extreme condition tasks are having their personal hydration systems fail as a result of too much external pressure.

The disclosed fluid reservoir shell provides a rigid shell for the fluid reservoir of a personal hydration system. The fluid reservoir shell is rigid and does not collapse easily under pressure. The fluid reservoir shell is sized to contain the fluid reservoir but still fits in the personal hydration system pack. Thus the fluid reservoir shell with fluid reservoir contained in it can be carried in the personal hydration system pack. The shell protects the fluid reservoir from external pressure and prevents the fluid reservoir from failing as a result of too much external pressure. Thus the user of the personal hydration system can use the system as usual without concern about losing their water supply from a fall or other event. The fluid reservoir shell provides ready access to the fill port and the drink tube of the fluid reservoir when the fluid reservoir is contained in the fluid reservoir shell. In this way the fluid reservoir shell does not slow down or impede the normal use of the fluid reservoir.

Figure 1:
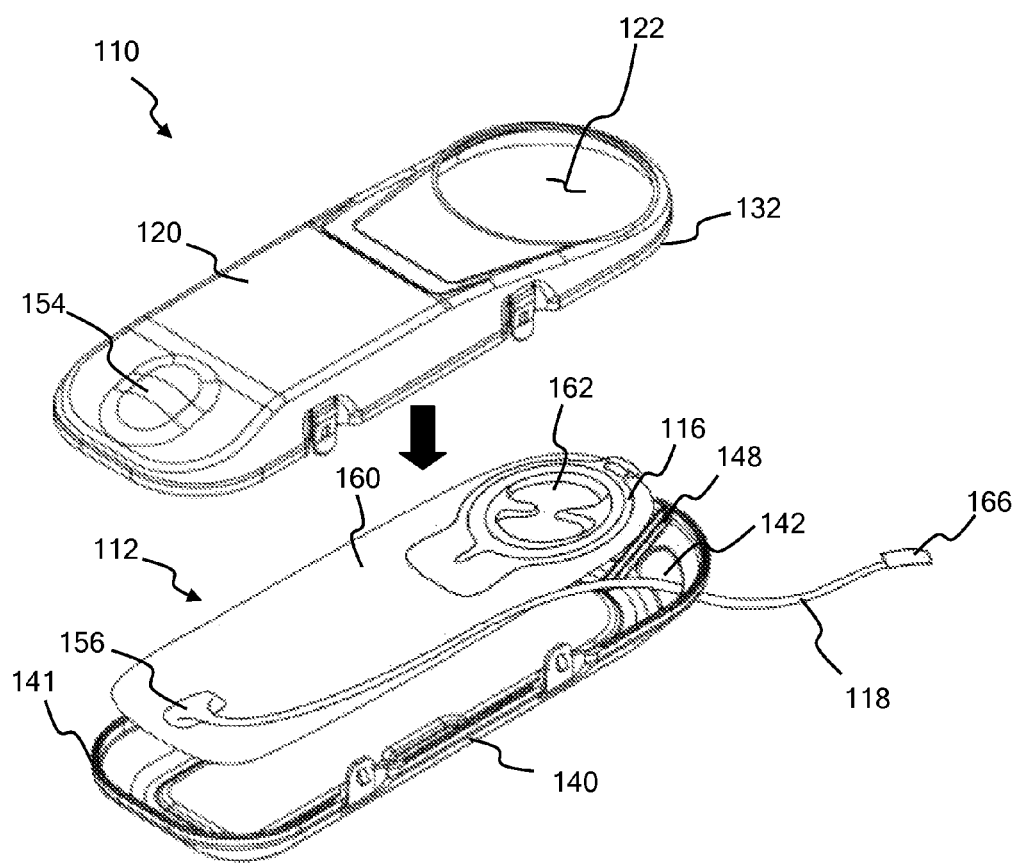
FIG. 1 is an exploded view of an embodiment of fluid reservoir shell 110 according to the invention, where fluid reservoir shell 110 contains fluid reservoir 112.
Figure 2:
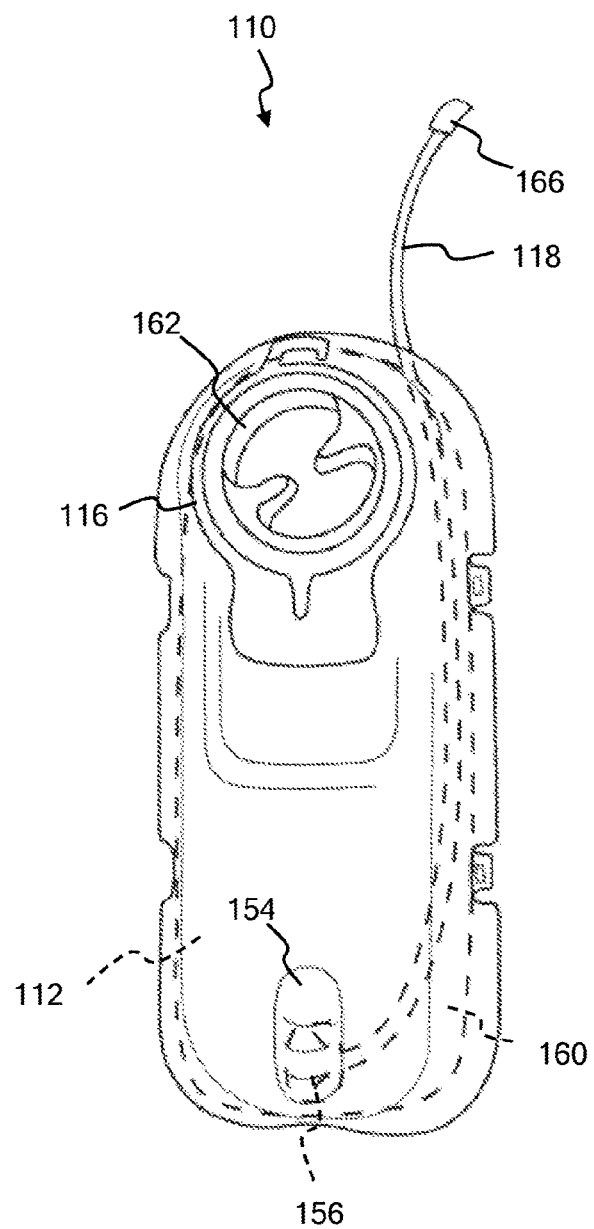
FIG. 2 is front perspective view of fluid reservoir shell 110 of FIG. 1 enclosing fluid reservoir 112.
Figure 3:
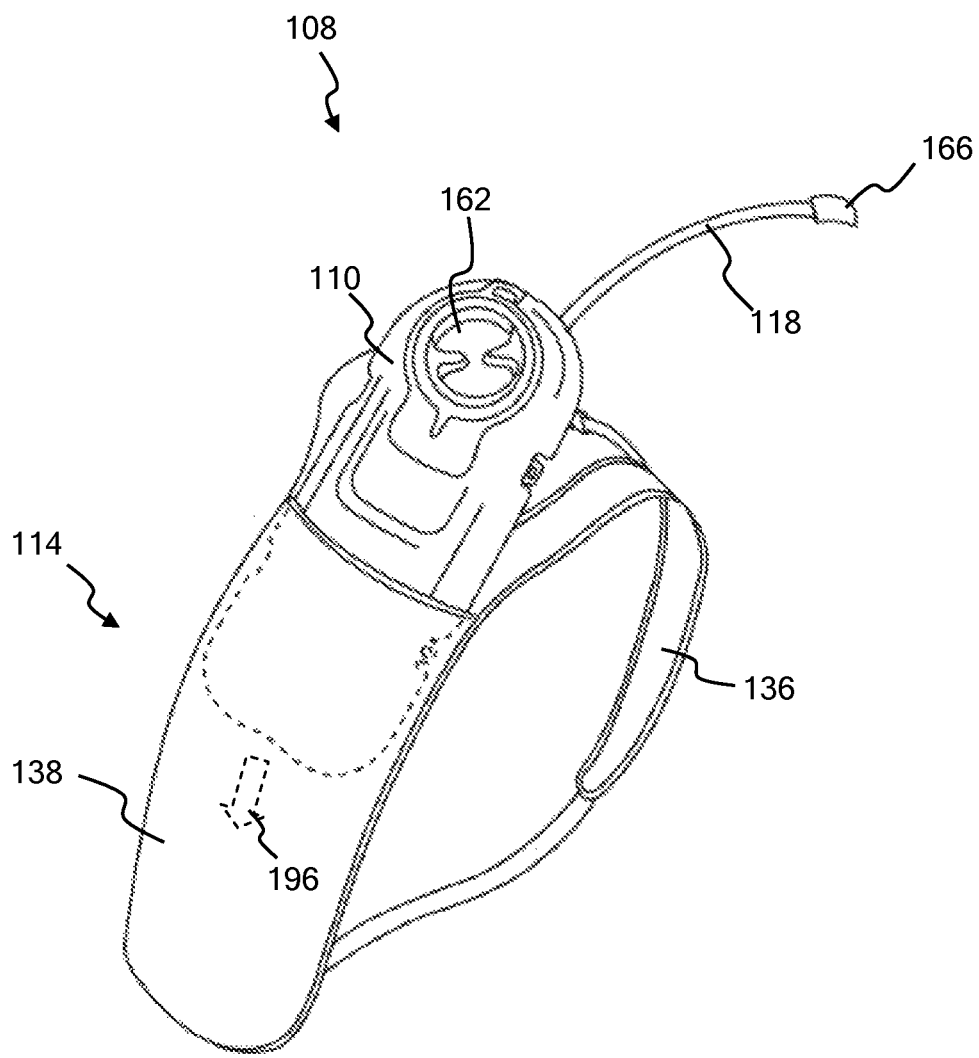
FIG. 3 is a front perspective view of an embodiment of personal hydration system 108 according to the invention, where personal hydration system 108 in this embodiment includes fluid reservoir shell 110 of FIG. 1.

FIG. 1 through FIG. 3 shows views of fluid reservoir 112 contained in an embodiment of fluid reservoir shell 110 according to the invention. FIG. 1 shows an exploded view of fluid reservoir 112 enclosed within one embodiment of fluid reservoir shell 110 according to the invention. FIG. 2 shows a front view of fluid reservoir shell 110 of FIG. 1, with fluid reservoir 112 contained inside of fluid reservoir shell 110. FIG. 3 shows a perspective view of an embodiment of personal hydration system 108 according to the invention, in which fluid reservoir shell 110 with fluid reservoir 112 contained inside of fluid reservoir shell 110 is inserted into pack 114 for easy carrying by an individual.

Personal hydration system 108 according to the invention includes fluid reservoir 112. Fluid reservoir 112 can take many forms. Embodiments of fluid reservoirs 112 can be purchased separately or together with many different types of carrying packs such as pack 114 shown in FIG. 3. Fluid reservoir 112 often includes fill port 116, fill port cap 162, bladder 160, and drink tube 118. Drink tube 118 is coupled to bladder 160 using drink tube coupler 156 (see FIG. 1). Drink tube 118 often has a mouthpiece 166 which allows the user to extract fluid from bladder 160. Fluid reservoir 112 can be obtained in many sizes and shapes, and the embodiment shown is meant to be exemplary and not limiting. Fluid reservoir shells 110 according to the invention can be formed to specific sizes and shapes to conform to the different sizes and shapes of fluid reservoirs 112.

Fluid is placed in bladder 160 through fill port 116. Bladder 160 is often rubber or plastic and flexible. Thus when fluid reservoir 112 is crushed or receives too much external pressure, the fluid from inside bladder 160 can leak out of fill port 116. Fill port cap 162 seals fill port 116 under normal circumstance, but fill port cap 162 is only able to withstand a certain amount of pressure from the fluid inside bladder 160, and when this pressure becomes too high, fill port cap 162 can pop off or leak.

Drink tube 118 is used by the individual using personal hydration system 108 to drink the fluid inside of bladder 160. Mouthpiece 166 is placed in the mouth and can be used to remove fluid from bladder 160 by suction, for example.

Personal hydration system 108 according to the invention also includes fluid reservoir shell 110, as shown in one embodiment in FIG. 1 through FIG. 13. Fluid reservoir shell 110 is comprised of a rigid material. Fluid reservoir shell 110 contains, or encloses, fluid reservoir 112 as shown in FIG. 1 and FIG. 2. Bladder 160 is protected from external pressure when fluid reservoir 112 is contained in fluid reservoir shell 110. Fluid reservoir shell 110 provides access to fill port 116 and drink tube 118 in response to fluid reservoir shell 110 enclosing fluid reservoir 112, as shown in FIG. 1 and FIG. 2. Bladder 160 is contained within the interior of fluid reservoir shell 110, and yet fill port 116 and drink tube 118 are accessible from the exterior of fluid reservoir shell 110 so that the user may access these parts of fluid reservoir 112 while fluid reservoir 112 is contained in fluid reservoir shell 110, as explained more fully below.

Personal hydration system 108 according to the invention includes pack 114, one example of which is shown in FIG. 3. Pack 114 can take many forms and is often purchased together with fluid reservoir 112. Pack 114 is used to carry fluid reservoir shell 110 and fluid reservoir 112. Fluid reservoir 110 according to the invention is sized to fit snugly around fluid reservoir 112 so that fluid reservoir shell 110 will fit inside pack 114. In some embodiments fluid reservoir shell 110 will fit inside a pack 114 designed to carry a particular fluid reservoir 112. In the embodiment shown shell 110 with fluid reservoir 112 inside of it slides into pack 114. Pack 114 has shoulder straps 136 which allows pack 114 to be carried on the body of the user such that mouthpiece 166 can be accessed easily in order to drink from drink tube 118. Pack 114 is often formed of a flexible material. When pack 114 is flexible and bladder 160 is flexible, bladder 160 can be crushed by too much external pressure, causing leakage or failure of fill port cap 162. But when fluid reservoir 112 is contained in fluid reservoir shell 110, bladder 160 is protected from external pressure and will no longer leak or lose its fluid as a result of too much external pressure. Fluid reservoir shell 110 can be placed in flexible pack 114 so that fill port 116, drink tube 118, and mouthpiece 166 are accessible to the user of personal hydration system 108. In this way fluid reservoir shell 110 contains fluid reservoir 112, protecting bladder 160 from external pressure and preventing fluid reservoir 112 from leaking, while still allowing fluid reservoir 112 to be carried and used normally using pack 114.

FIG. 4 through FIG. 12 show details of the embodiment of fluid reservoir shell 110 (also called shell 110) of FIG. 1. It is to be understood that the embodiment of fluid reservoir shell 110 shown in the drawings is an example of one embodiment of shell 110 and is not meant to be limiting. Fluid reservoir shell 110 can take many sizes and forms according to the specific design of the fluid reservoir 112 and/or pack 114 that fluid reservoir shell 112 is to be used with. Fluid reservoir shell 110 according to the invention does not have to be used with an embodiment of pack 114. In some embodiments fluid reservoir shell 110 with fluid reservoir 112 contained within it are used without pack 114. In some embodiments fluid reservoir shell 110 includes mounting or coupling features that allows fluid reservoir shell 110 to be mounted inside the cab of a vehicle, tractor, or other wheeled machine or piece of heavy equipment, for example. Fluid reservoir shell 110 according to the invention can be used to contain fluid reservoir shell 112, with or without pack 114 or any other accessory.

Figure 4:
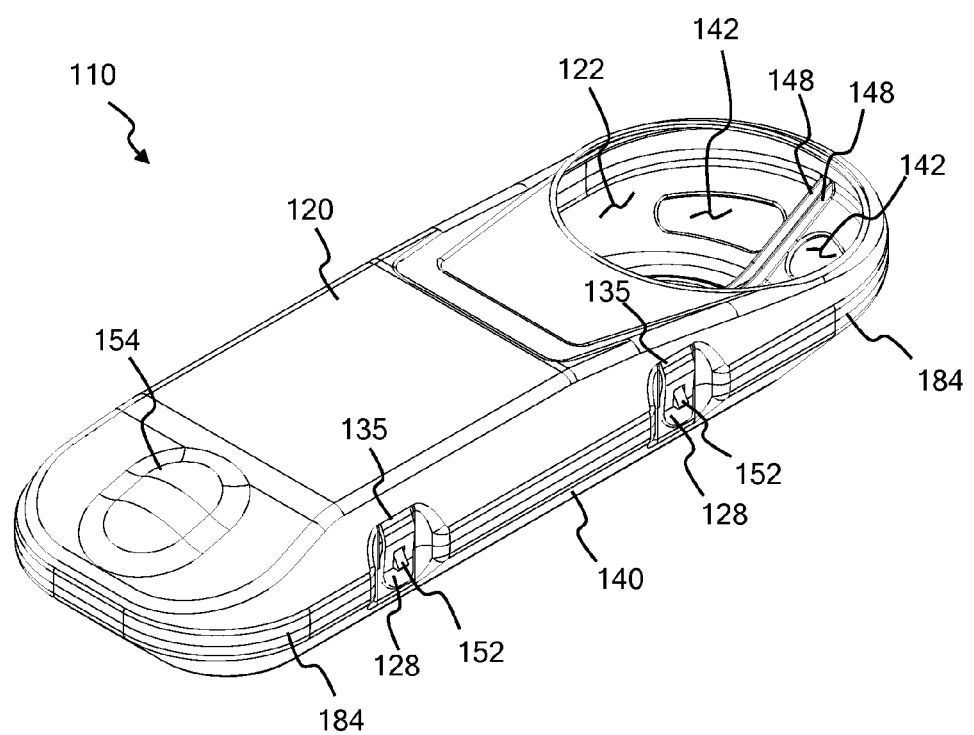
FIG. 4 is a top isometric view of fluid reservoir shell 110 of FIG. 1.
Figure 5:
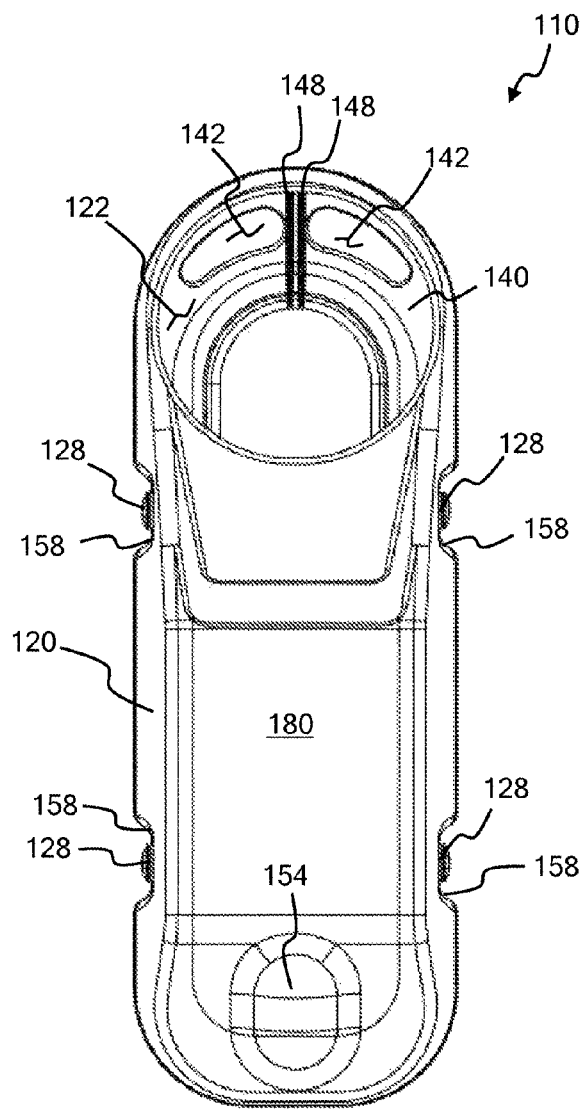
FIG. 5 is a top view of fluid reservoir shell 110 of FIG. 1.
Figure 6:
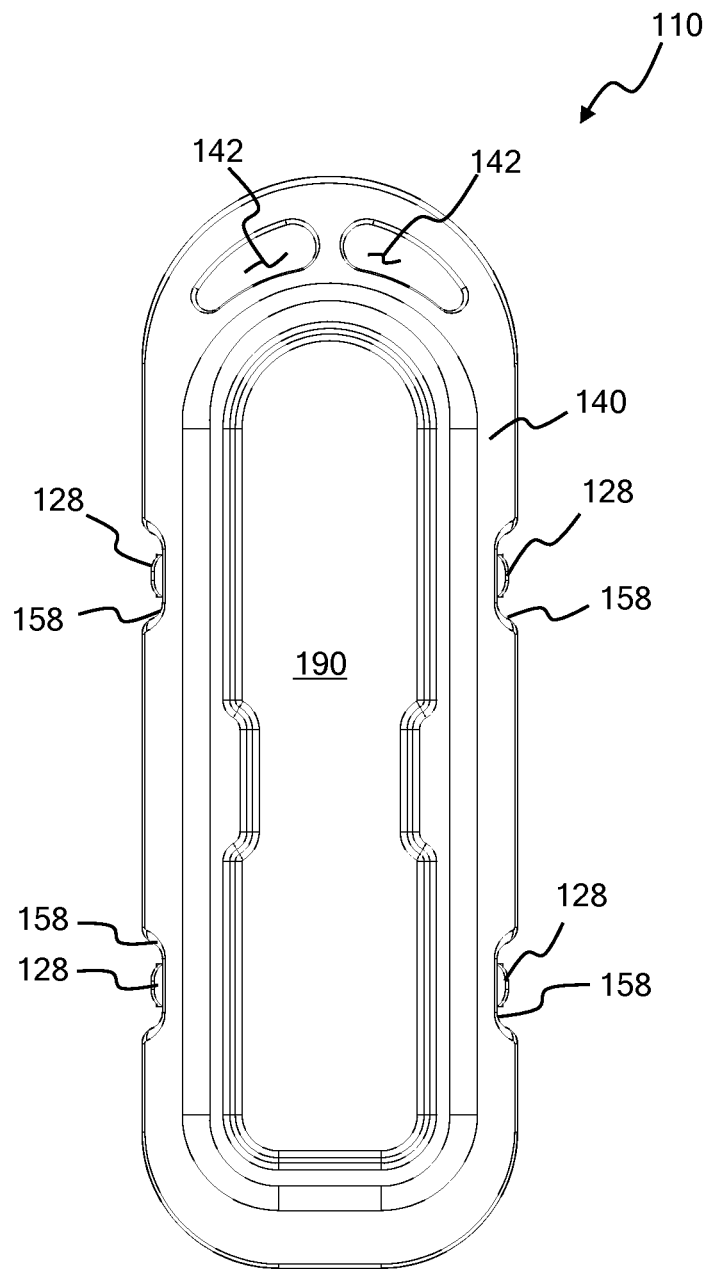
FIG. 6 is a bottom view of fluid reservoir shell 110 of FIG. 1.
Figure 7:
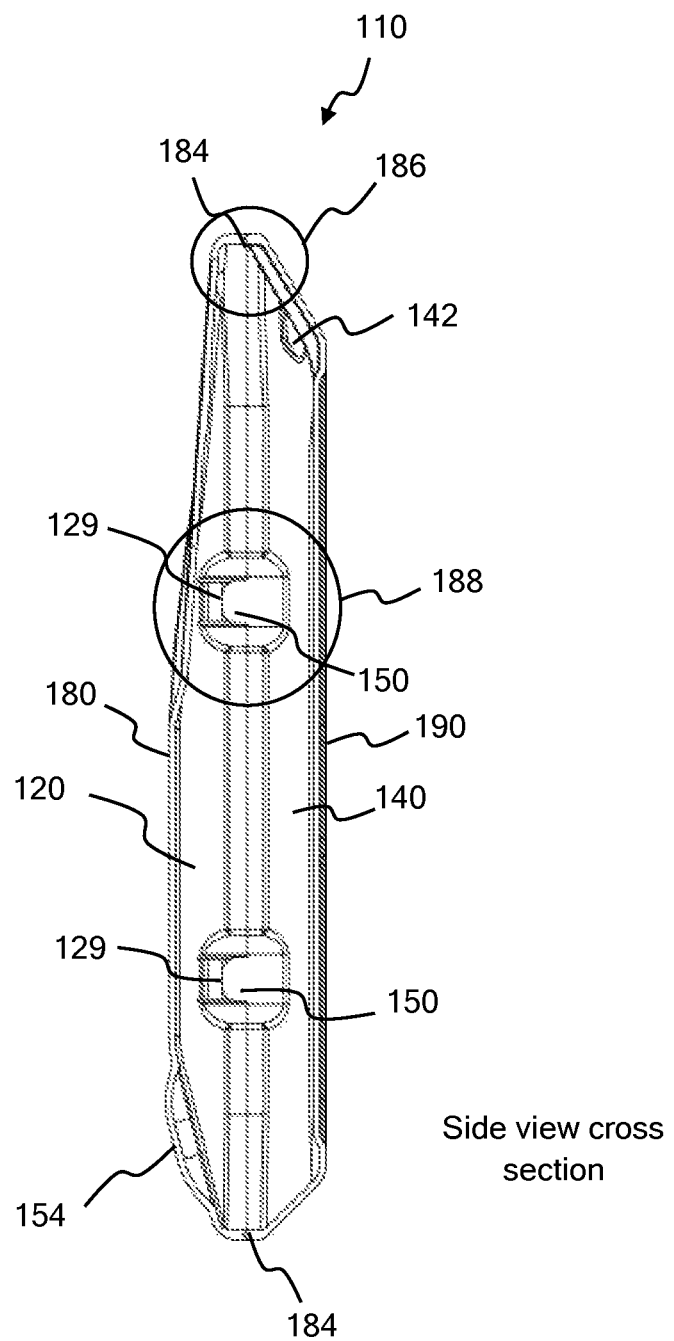
FIG. 7 is a side view cross section of fluid reservoir shell 110 of FIG. 1.
Figure 8:
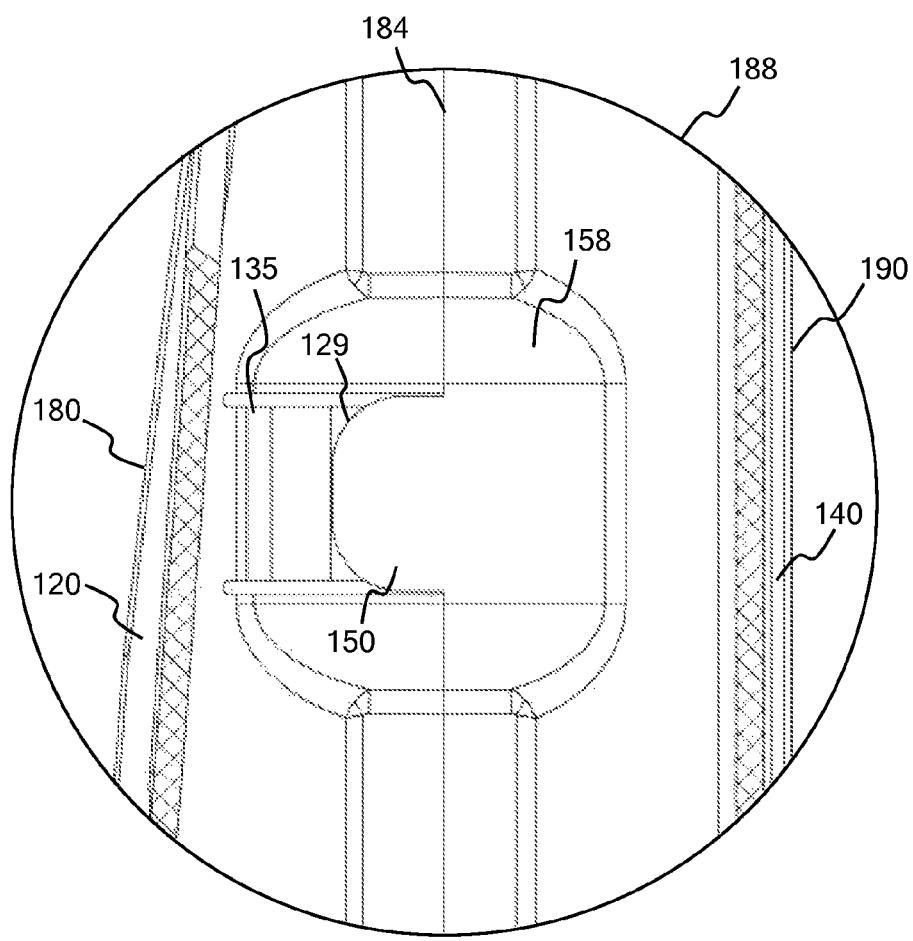
FIG. 8 is a close-up view of section 188 of FIG. 7.
Figure 9:
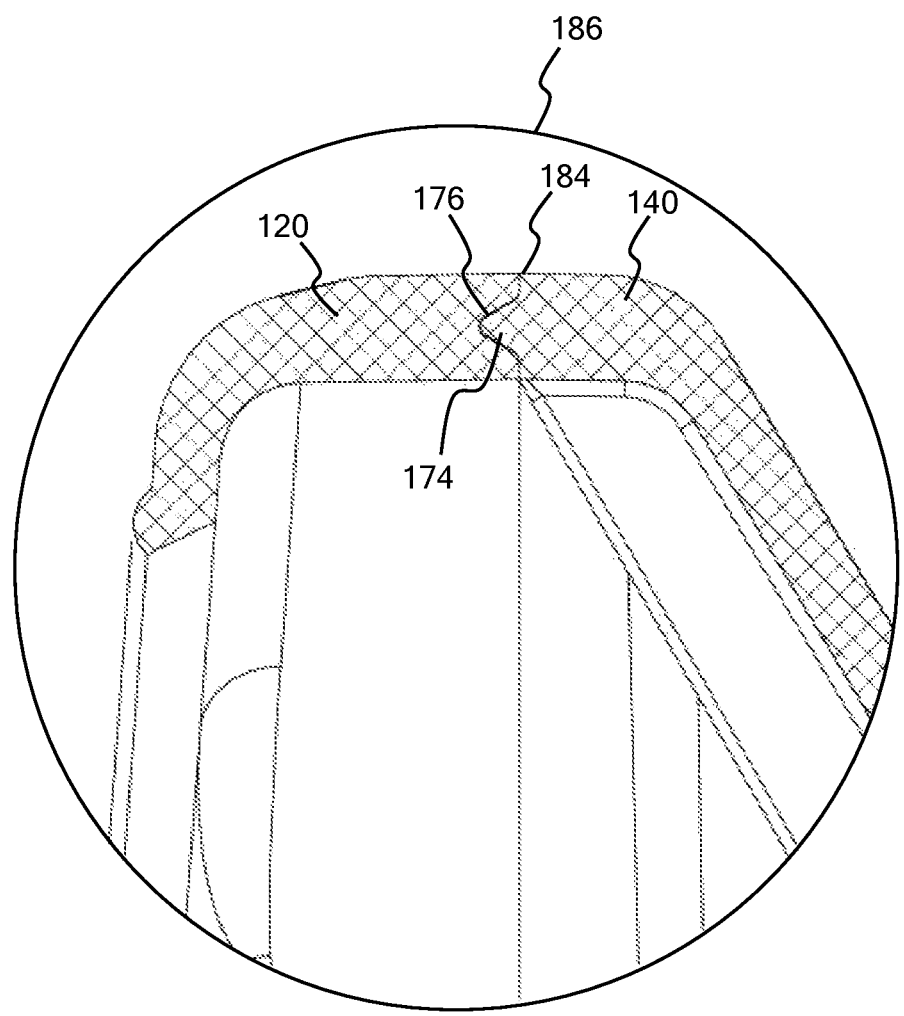
FIG. 9 is a close-up cross section view of section 186 of FIG. 7.
Figure 10:
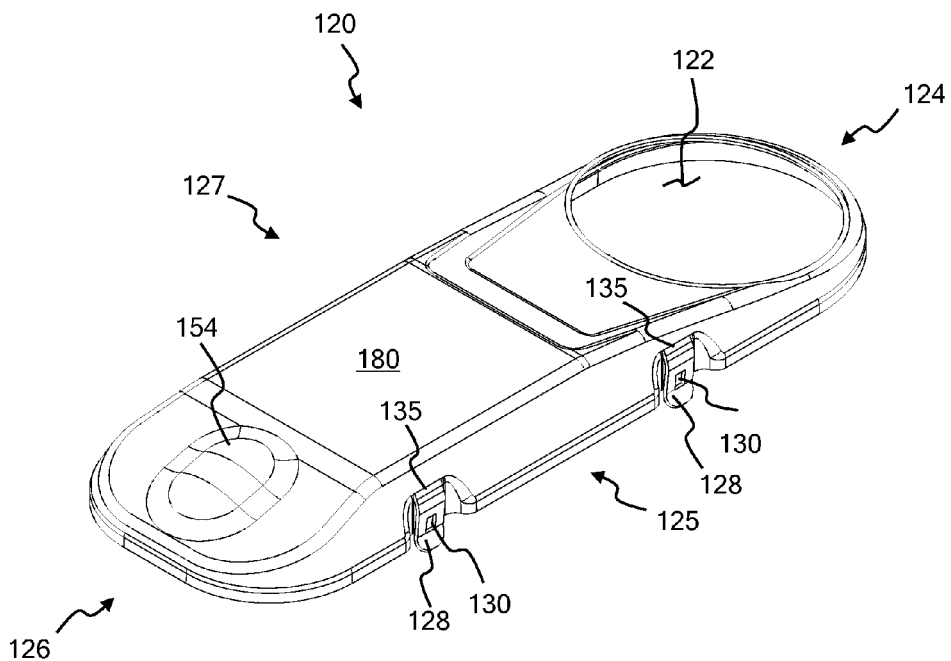
FIG. 10 is a top isometric view of shell top piece 120 of fluid reservoir shell 110 of FIG. 1.
Figure 11:
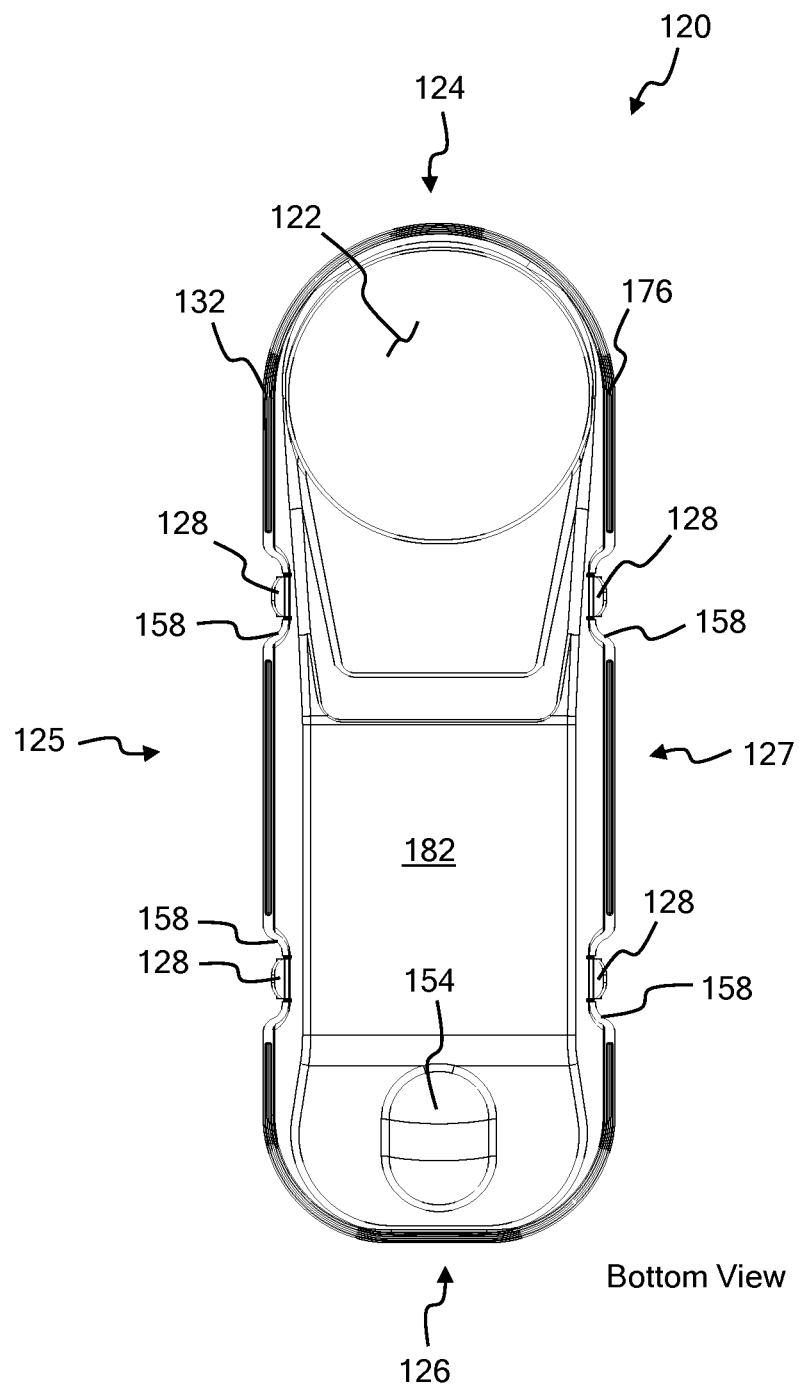
FIG. 11 is a bottom view of shell top piece 120 of fluid reservoir shell 110 of FIG. 1.
Figure 12:
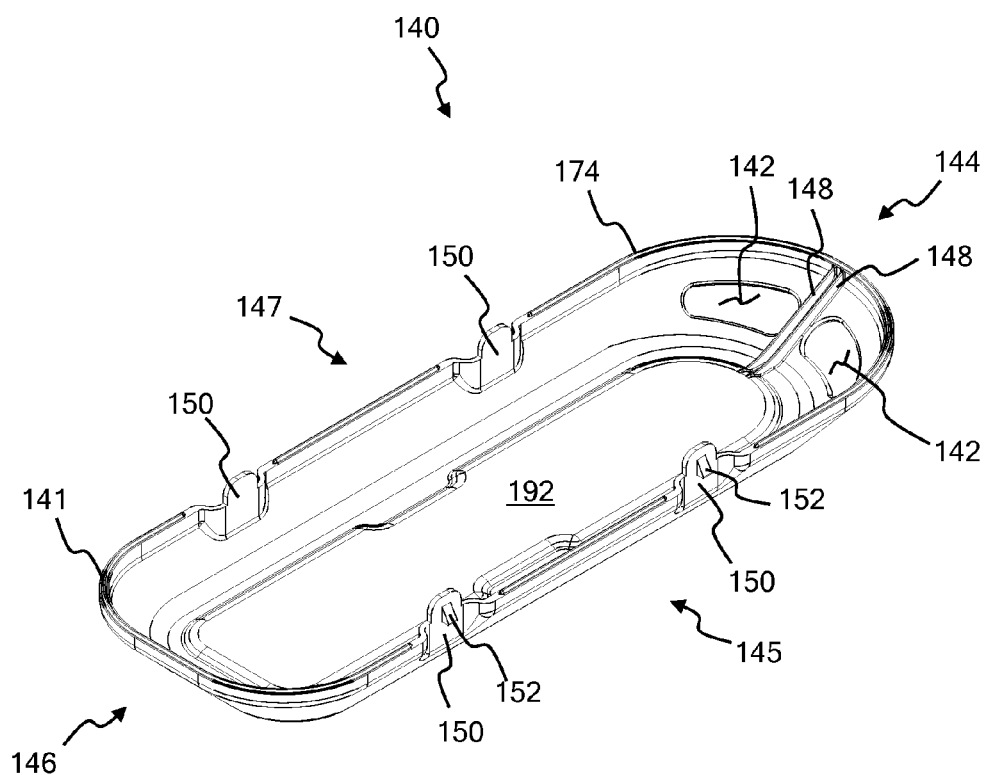
FIG. 12 is a top isometric view of shell bottom piece 140 of fluid reservoir shell 110 of FIG. 1.
Figure 13:
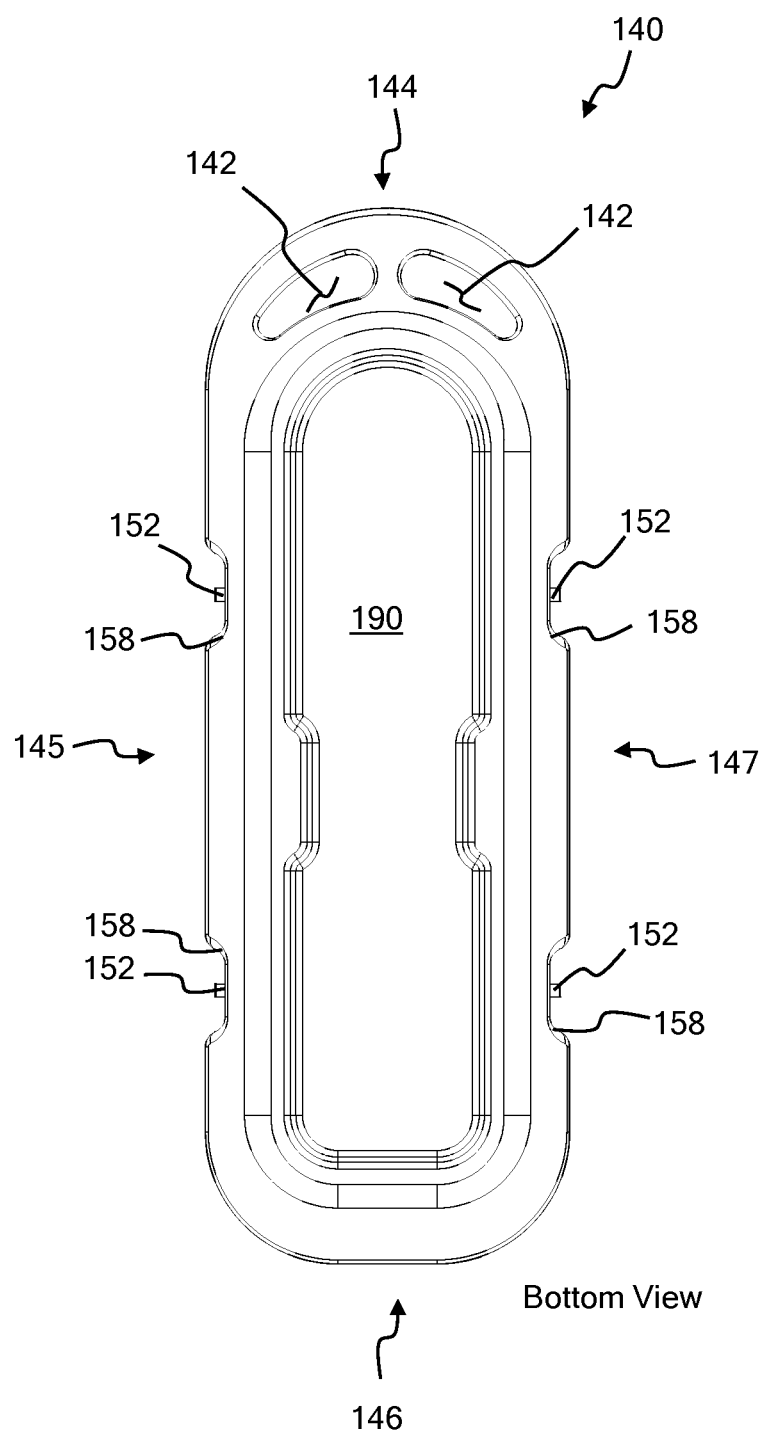
FIG. 13 is a bottom view of shell bottom piece 140 of fluid reservoir shell 110 of FIG. 1.

FIG. 4 shows a front perspective view of fluid reservoir shell 110 of FIG. 1. FIG. 5 shows a top view of fluid reservoir shell 110 of FIG. 1. FIG. 6 shows a bottom view of fluid reservoir shell 110 of FIG. 1. FIG. 7 shows a side view cross section of fluid reservoir shell 110 of FIG. 1. FIG. 8 shows a close-up expanded view of cross section 188 of fluid reservoir shell 110 of FIG. 7. FIG. 9 shows a close-up expanded cross section view of section 186 of fluid reservoir shell 110 of FIG. 7. FIG. 10 shows a top perspective view of shell top piece 120 of FIG. 1. FIG. 11 shows a bottom view of shell top piece 120 of FIG. 1. FIG. 12 shows a top perspective view of shell bottom piece 140 of FIG. 1. FIG. 13 shows a bottom view of shell bottom piece 140 of FIG. 1.

Fluid reservoir shell 110 as shown in the figures includes shell top piece 120 and shell bottom piece 140. Shell top piece 120 is formed of a rigid material. Shell bottom piece 140 is formed of a rigid material. Shell top piece 120 and shell bottom piece 140 repeatably and removeably couple together to contain fluid reservoir 112 as shown in FIG. 1 through FIG. 9. Shell top piece 120 and shell bottom piece 140 being removeably coupled together means that shell top piece 120 and shell bottom piece 140 can be coupled together, and then de-coupled, without harming shell top piece 120 or shell bottom piece 140. Shell top piece 120 and shell bottom piece 140 can be de-coupled so that a fluid reservoir 112 can be inserted into shell 110, or so that one fluid reservoir 112 can be replaced with another fluid reservoir 112, for instance. Shell top piece 120 and shell bottom piece 140 being repeatably coupled together means that shell top piece 120 and shell bottom piece 140 can be coupled together numerous times without harming shell top piece 120, shell bottom piece 140, or the coupling devices used to couple shell top piece 120 to shell bottom piece 140. Shell top piece 120 and shell bottom piece 140 can be coupled and de-coupled numerous times.

Shell top piece 120 and shell bottom piece 140 couple together such that bladder 160 is enclosed within the interior of shell 110, and yet fill port 116, fill port cap 162, and drink tube 118 are accessible from the exterior of shell 110. In this way fill port 116, fill port cap 162, and drink tube 118 can be accessed easily while bladder 160 is enclosed in shell 110.

Fluid reservoir shell 110 according to the invention is shown comprising two pieces, shell top piece 120 and shell bottom piece 140. It is to be understood that in some embodiments fluid reservoir shell 110 according to the invention is formed in one piece. In this embodiment fluid reservoir shell 110 can be formed with an access hole for inserting and removing fluid reservoir 112. In some embodiments fluid reservoir shell 110 according to the invention is formed of more than two pieces. Fluid reservoir shell 110 according to the invention can be formed of any number of pieces which allow fluid reservoir shell 110 to contain fluid reservoir 112.

Shell top piece 120 and shell bottom piece 140 are formed of a rigid material so that shell 110 can withstand external pressure without collapsing. In some embodiments shell top piece 120 and/or shell bottom piece 140 are formed of plastic. In some embodiments shell top piece 120 and/or shell bottom piece 140 are formed of metal. In some embodiments shell top piece 120 and/or shell bottom piece 140 are formed of aluminum. In some embodiments shell top piece 120 and/or shell bottom piece 140 are formed of rubber. In some embodiments shell top piece 120 and/or shell bottom piece 140 are formed of other rigid materials. Shell top piece 120 and shell bottom piece 140 can be formed of any material that can withstand pressure without collapsing, so that shell 110 can protect bladder 160 from receiving external pressure during a fall or other event where personal hydration system 108 and/or bladder 160 receives external pressure of an amount that may cause fluid reservoir 112 to leak. External pressure is pressure received on bladder 160, fluid reservoir 112, or personal hydration system 108 that tends to force any liquids that are inside of bladder 160 out of bladder 160. It is undesirable for bladder 160 to receive external pressure of a level that could cause failure of bladder 160 or fluid reservoir 112. External pressure can cause fluids inside of bladder 160 to be forced out of fill port 116. For example, external pressure can cause fluids inside of bladder 160 to be forced out of fill port 116 by causing fill port cap 162 to fail or pop off. External pressure can cause bladder 160 to rip or fail at a seam, allowing fluids inside to leak out. Shell 112 is designed to keep bladder 160 from receiving the type of external pressure than will cause failures of bladder 160 or fluid reservoir 112.

Fluid reservoir shell 110 according to the invention includes shell top piece 120. Shell top piece 120 includes fill port opening 122 (see FIG. 1, FIG. 4, FIG. 5, FIG. 10, and FIG. 11). Shell top piece 120 also includes shell top piece top end 124, shell top piece bottom end 126, shell top piece first and second sides 125 and 127, and drink tube dome 154. Shell top piece 120 has shell top piece outer surface 180 and shell top piece inner surface 182. In the embodiment shown shell top piece 120 also has four top tab couplers 128, which are used to couple shell top piece 120 to shell bottom piece 140, as will be explained shortly.

Fill port opening 122 is configured to couple to fill port 116 of fluid reservoir 112, as shown in FIG. 2. Fill port 116 of fluid reservoir 112 couples to shell top piece 120 such that fill port 116 protrudes from fill port opening 122. Fluid reservoir 112 is coupled to shell top piece 120 by placing fill port 116 through fill port opening 122 from the bottom side of shell top piece 120. Fill port opening 122 is sized to frictionably engage fill port 116. Fill port 116 couples to fill port opening 122 such that fill port cap 162 can be accessed and used to seal bladder 160. Once fill port 116 is coupled to fill port opening 122, bladder 160 lays against shell top piece inner surface 182, and fill port 116 extends through fill port opening 122 such that fill port 116 and fill port cap 162 are accessible from the exterior of fluid reservoir shell 112, as shown in FIG. 2. Once fluid reservoir 112 is coupled to shell top piece 120, shell bottom piece 140 is coupled to shell top piece 120, enclosing bladder 160 in the interior of shell 110, where it is protected by shell 110 from external pressure.

In the embodiment of fluid reservoir shell 110 shown in the drawings, fill port opening 122 is located at shell top piece top end 124. Fill port opening 122 is located at shell top piece top end 124 because fill port 116 is located at the top end of fluid reservoir 112.

Shell top piece 120 in the embodiments shown includes drink tube dome 154. Drink tube dome 154 is a domed protrusion in shell top piece 120 that covers drink tube coupler 156 of fluid reservoir 112. Drink tube coupler 156 is where drink tube 118 is coupled to bladder 160. Drink tube coupler 156 consumes a certain amount of space and should be protected from being bent or flattened. If drink tube coupler 156 is bent or flattened too much, fluid may not flow easily from bladder 160 to drink tube 118, which will cut off the flow of liquids to the user and limit the usefulness of fluid reservoir 112. It has been found that providing extra depth in shell 110 for drink tube coupler 156 is advantageous. Drink tube dome 154 provides drink tube coupler 156 with the space it needs while protecting drink tube coupler 156 from being bent, flattened, kinked, or broken. Drink tube dome 154 provides drink tube coupler 156 with the additional space it needs without taking space away from bladder 160. In the embodiment shown drink tube dome 154 does not have an opening for drink tube 118. In the embodiment shown in the figures, drink tube 118 runs along the inside of shell 110 to the top end of shell bottom piece 140, exiting shell 110 at drink tube port 142, see FIG. 1. This works well because this protects drink tube 118 from being crushed and also prevents drink tube 118 from being bent at or near drink tube coupler 156. In some embodiments of shell 110, drink tube dome 154 includes an opening for drink tube 118 so that drink tube 118 can exit shell 110 at drink tube dome 154. In some embodiments drink tube dome has an opening for drink tube 118 that can be opened or closed as desired.

Shell top piece 120 in some embodiments also includes means to couple shell top piece 120 to shell bottom piece 140. In the embodiments shown in the figures, shell top piece 120 includes one or more than one top tab coupler 128 and tab coupler slots 129 (see FIG. 7 and FIG. 8) for coupling shell top piece 120 to shell bottom piece 140. In the embodiments of shell top piece 120 shown, shell top piece 120 includes four top tab couplers 128, two on side 127 of shell top piece 120, and two on side 125 of shell top piece 120. Top tab couplers 128 are positioned within tab coupler indent 158. Tab coupler indents 158 are recessed indentations in the body of shell 110 (see FIG. 11, for example). Top tab couplers 128 are placed within tab coupler indents 158 so that top tab couplers 128 are recessed in the body of shell 110. Top tab couplers 128 being recessed in the body of shell top piece 120 helps to keep top tab couplers 128 from breaking or snagging or catching on hands, clothing, or other items.

Top tab couplers 128 are flat tab protrusions extending from the body of shell top piece 120 at top tab coupler base 135 (see FIG. 10, for example). Top tab couplers 128 each extend from a top tab coupler base 135 approximately parallel to sides 125 or 127. Top tab coupler bases 135 are formed of a rigid material that is capable of flexing without breaking, because top tab couplers 128 will flex outwards at top tab coupler bases 135 to receive bottom tab couplers 150 underneath top tab coupler 128.

Each top tab coupler 128 in this embodiment includes a tab coupler hole 130. Tab coupler hole 130 in this embodiment is a square hole sized to receive tab coupler tooth 152 of bottom tab coupler 150 on shell bottom piece 140.

In the embodiment of shell top piece 120 according to the invention shown in the figures, shell top piece 120 also includes one or more than one tab coupler slot 129, as shown in FIG. 7 and FIG. 8. Each tab coupler slot 129 is underneath a corresponding top tab coupler 128, adjacent top tab coupler base 135. Tab coupler slot 129 is a cutout in shell top piece 120 sized to fit bottom tab couplers 150 of shell bottom piece 140, see FIG. 7 and FIG. 8. Thus each tab coupler slot 129 is configured to receive a bottom tab coupler 150. FIG. 7 shows a side view cross section of shell 110 showing that each bottom tab coupler 150 of shell bottom piece 140 fits into a corresponding tab coupler slot 129 of shell top piece 120. FIG. 8 shows a close up view of section 188 of FIG. 7, showing that tab coupler slot 129 is shaped to fit bottom tab coupler 150. When putting shell top piece 120 and shell bottom piece 140 together, bottom tab coupler 150 and tab coupler slot 129 are used to align the two pieces so they are placed together correctly. Each bottom tab coupler 150 slips into a corresponding tab coupler slot 129, helping to place the two pieces—shell top piece 120 and shell bottom piece 140—together quickly and accurately without having to fiddle with them.

Top tab couplers 128, tab coupler holes 150, and tab coupler slots 129 can take many forms, shapes, and types. Shell top piece 120 according to the invention can include many types of couplers to couple shell top piece 120 to shell bottom piece 140. Top tab couplers 128 can be replaced or supplemented by clips, snaps, buckles, ties, or locks, for example but not by way of limitation. Shell top piece 120 and shell bottom piece 140 can include any type of coupling device or method to couple shell top piece 120 and shell bottom piece 140 together.

In the embodiment of shell top piece 120 according to the invention shown in the figures, shell top piece 120 also includes groove 176 along a portion of perimeter 132 of shell top piece 120, see FIG. 9 and FIG. 11. Groove 176 runs along a portion of perimeter 132 so that groove 176 can receive tongue 174 of shell bottom piece 140, as shown in FIG. 9. Shell top piece 120 and shell bottom piece 140 butt together at seam 184 of shell 110. Tongue 174 of shell bottom piece 140 and groove 176 of shell top piece 120 help the two pieces mate quickly, correctly, and securely. In the embodiment shown, groove 176 is a v-groove, which means it is shaped with a v-shape, and tongue 174 is a v-tongue, which means it is shaped with a v-shape. But it is to be understood that groove 176 and tongue 174 can take many shapes and sizes and the example embodiment shown is not meant to be limiting. In some embodiments groove 176 is on shell bottom piece 140 and tongue 174 is on shell top piece 120. Groove 176 and tongue 174 can take many different forms, shapes, and placements to help shell top piece 120 and shell bottom piece 140 couple quickly, easily, and securely.

Fluid reservoir shell 110 according to the invention includes shell bottom piece 140. Shell bottom piece 140 includes two drink tube ports 142 (see FIG. 1, FIG. 4-FIG. 7, FIG. 12, and FIG. 13). Shell bottom piece 140 has shell bottom piece top end 144, shell bottom piece bottom end 146, shell bottom piece first and second sides 145 and 147, and reinforcing ridges 148. Shell bottom piece 140 has shell bottom piece outer surface 190 and shell bottom piece inner surface 192. In the embodiment shown shell bottom piece 140 also has four bottom tab couplers 150, which are used to couple shell top piece 120 to shell bottom piece 140.

Drink tube port 142 is used to allow drink tube 118 to pass through from the interior of shell 110 to the exterior of shell 110, so that mouthpiece 166 and drink tube 118 can be accessed by the user while fluid reservoir 112 is contained within shell 110 (see FIG. 1 through FIG. 3). In the embodiments of shell 110 shown in the figures, shell bottom piece 140 includes two drink tube ports 142. It is to be understood that shell bottom piece 140 according to the invention can include one drink tube port 142, or more than two drink tube ports 142, according to the specific design and use of shell 110. In the embodiment shown, shell bottom piece 140 includes two drink tube ports 142, located side-by side at shell bottom piece top end 144. Drink tube ports 142 are located side-by side at shell bottom piece top end 144 because that allows drink tube 118 to be protected along the length of drink tube 118 that lies along bladder 160 from drink tube coupler 156 to the top end of bladder 160. Drink tube 118 is usually accessed by the user at or near the top end of bladder 160. So in the embodiment of shell 110 shown, drink tube 118 will exit shell 110 at one of the two drink tube ports 142 at shell bottom piece top end 144. Two drink tube ports 142 are used so that drink tube 118 can exit shell 110 on either side without excessive bending, which could cause a kink in drink tube 118.

In some embodiments of shell 110, one or more than one drink tube port 142 is placed in other locations on shell bottom piece 140 or on shell top piece 120, depending on the specific routing of drink tube 118 that is desired. Drink tube port 142 can be placed anywhere on shell 110 that allows access to drink tube 118 from the exterior of shell 110 while fluid reservoir 112 is contained in shell 110.

In the embodiment of shell bottom piece 140 shown in the figures, shell bottom piece 140 includes two reinforcing ridges 148. Reinforcing ridges 148 in this embodiment run longitudinally between the two drink ports 142. Reinforcing ridges 148 running longitudinally means that reinforcing ridges 148 run substantially parallel to a longitudinal line of shell bottom piece 140. Longitudinal lines of shell bottom piece 140 extend between top end 144 and bottom end 146. In some embodiments of shell bottom piece 140, reinforcing ridges 148 extend laterally, substantially parallel to a lateral line, where a lateral line in this embodiment extends between first side 145 and second side 147. In some embodiments reinforcing ridges 148 can extend in other directions. Reinforcing ridges 148 according to the invention can be used in any number and placed in many different positions to reinforce different areas of shell bottom piece 140.

Reinforcing ridges 142 are used to reinforce shell bottom piece 140 top end 144 from being crushed or broken, and in this embodiment to specifically reinforce the area between the two drink ports 142. The area between drink ports 142 in this embodiment is an area that is particularly susceptible to breakage and stress fractures because there is a small area of material between the two drink tube ports 142.

Shell bottom piece 140 also includes, in some embodiments, means to couple shell bottom piece 140 to shell top piece 120. In the embodiments shown in the figures, shell bottom piece 140 includes one or more than one bottom tab coupler 150 for coupling shell top piece 120 to shell bottom piece 140 (see FIG. 12). In the embodiments of shell bottom piece 140 shown, shell bottom piece 140 include four bottom tab couplers 150, two on side 147 of shell bottom piece 140, and two on side 145 of shell bottom piece 140, as shown in FIG. 12, for example. Bottom tab couplers 150 are placed within tab coupler indent 158. Tab coupler indents 158 are recessed indentations in the body of shell 110. Bottom tab couplers 150 are placed within tab coupler indents 158 so that bottom tab couplers 150 are recessed in the body of shell 110. Bottom tab couplers 150 being recessed in the body of shell bottom piece 140 helps to keep bottom tab couplers 150 from breaking or snagging or catching on hands, clothing, or other items.

Bottom tab couplers 150 are flat tab protrusions extending from the body of shell bottom piece 140. Bottom tab couplers 150 each extend from shell bottom piece 140 approximately parallel to sides 145 or 147. To couple shell bottom piece 140 to shell top piece 120, each bottom tab coupler 150 is positioned within a corresponding tab coupler slot 129, as shown in FIG. 7 and FIG. 8. In FIG. 7 and FIG. 8 it can be seen how bottom tab couplers 150 each fit into a tab coupler slot 129 on shell top piece 120. Fitting bottom tab couplers 150 into tab coupler slots 129 allows shell top piece 120 and shell bottom piece 140 to be mated quickly and easily.

Each bottom tab coupler 150 in this embodiment includes a tab coupler tooth 152. Tab coupler tooth 152 in this embodiment is a square nub or tooth protrusion from each bottom tab coupler 150 that is sized and shaped to fit into a tab coupler hole 130 of a corresponding top tab coupler 128 on shell top piece 120. Each bottom tab coupler 150 slides beneath a corresponding top tab coupler 128 of shell top piece 120 to fit into tab coupler slot 129 of shell top piece 120. Each tab coupler tooth 152 fits into a corresponding tab coupler hole 30. Top tab couplers 128 are biased to put pressure on bottom tab couplers 150, which pressure holds tab coupler tooth 152 in tab coupler hole 130, which securely couples shell bottom piece 140 to shell top piece 120. Thus in this embodiment of fluid reservoir shell 110 according to the invention, shell top piece 120 is coupled to shell bottom piece 140 in response to tab coupler tooth 152 extending into tab coupler hole 130. In this embodiment shell bottom piece 140 couples to shell top piece 120 in response to tab coupler slot 129 receiving bottom tab coupler 150, and tab coupler tooth 152 extending into tab coupler hole 130 of top tab coupler 128.

Bottom tab couplers 150 and tab coupler teeth 152 can take many forms, shapes, and types. Shell bottom piece 140 according to the invention can include many types of couplers to couple shell bottom piece 140 to shell top piece 120. Bottom tab couplers 150 can be replaced or supplemented by clips, snaps, buckles, ties, or locks, for example but not by way of limitation. Shell top piece 120 and shell bottom piece 140 can include any type of coupling device or method to couple shell top piece 120 and shell bottom piece 140 together.

In the embodiment of shell bottom piece 140 according to the invention shown in the figures, shell bottom piece 140 also includes tongue 174 along a portion of perimeter 141 of shell bottom piece 140, as shown in FIG. 9 and FIG. 12. Tongue 174 runs along a portion of perimeter 141 so that tongue 174 can be placed in groove 176 of shell top piece 120, as shown in FIG. 9 and explained earlier. Shell top piece 120 and shell bottom piece 140 butt together at seam 184 of shell 110. Tongue 174 of shell bottom piece 140 and groove 176 of shell top piece 120 help the two pieces mate quickly, correctly, and securely. In the embodiment shown, tongue 174 is a v-tongue, which means it is shaped with a v-shape, and groove 176 is a v-groove, which means it is shaped with a v-shape. But it is to be understood that groove 176 and tongue 174 can take many shapes and sizes and the example embodiment shown is not meant to be limiting. In some embodiments groove 176 is on shell bottom piece 140 and tongue 174 is on shell top piece 120. Groove 176 and tongue 174 can take many different forms, shapes, and placements to help shell top piece 120 and shell bottom piece 140 couple quickly, easily, and securely.

Figure 14:
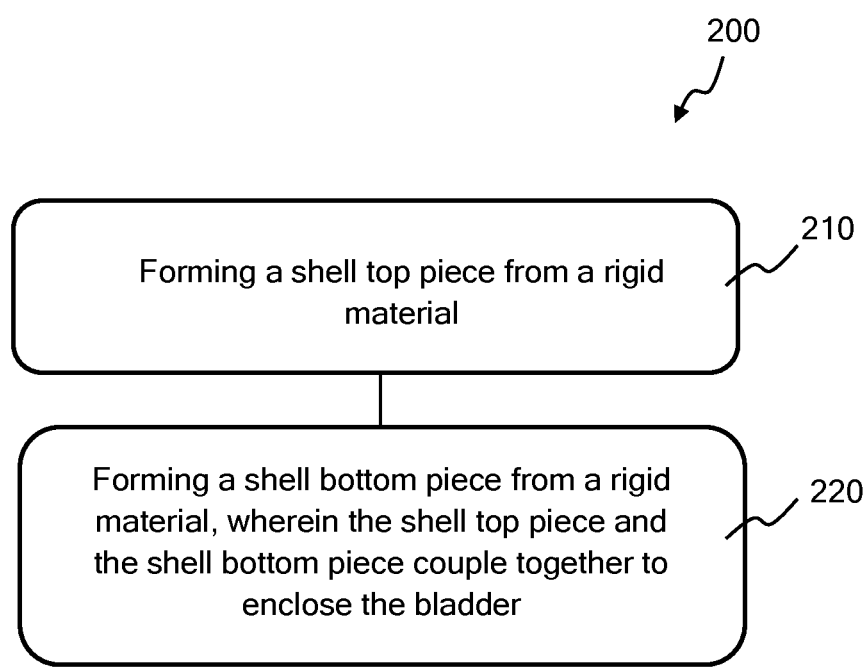
FIG. 14 illustrates method 200 of forming a fluid reservoir shell that encloses a bladder of a personal hydration system according to the invention.

FIG. 14 illustrates method 200 of forming a fluid reservoir shell that encloses a bladder of a personal hydration system. Method 200 of forming a fluid reservoir shell that encloses a bladder of a personal hydration system according to the invention includes step 210 of forming a shell top piece from a rigid material, and step 220 of forming a shell bottom piece from a rigid material, where the shell top piece and the shell bottom piece couple together to enclose the bladder. Method 200 according to the invention can include many other steps. In some embodiments method 200 includes the step of forming a fill port opening in the shell top piece, where the fill port opening couples to a fill port of the fluid reservoir. In some embodiments method 200 includes the step of forming a drink tube port in the shell bottom piece, where a drink tube of the fluid reservoir extends through the drink tube port. In some embodiments method 200 includes the step of forming a drink tube dome in the shell top piece.

In some embodiments step 210 forming a shell top piece includes the step of forming a fill port opening, where the fill port opening couples to a fill port of the fluid reservoir. In some embodiments step 210 includes the step of placing the fill port opening at a shell top piece top end. In some embodiments step 210 forming a shell top piece includes the step of forming a drink tube dome in a shell top piece bottom end, where the drink tube dome protects a drink tube coupler of the bladder in response to the fluid reservoir being contained in the fluid reservoir shell. In some embodiments step 210 forming a shell top piece includes the step of forming a tab coupler slot, where the tab coupler slot receives a bottom tab coupler of the shell bottom piece. In some embodiments step 210 forming a shell top piece includes the step of forming a v-groove along a portion of the perimeter of the shell top piece, where the v-groove mates with a v-tongue of the shell bottom piece. In some embodiments step 210 forming a shell top piece includes the step of forming a v-tongue along a portion of the perimeter of the shell top piece, where the v-tongue mates with a v-groove of the shell bottom piece. In some embodiments step 210 forming a shell top piece includes the step of forming a top tab coupler, where the top tab coupler couples with a bottom tab coupler of the shell bottom piece to couple the shell top piece to the shell bottom piece. In some embodiments the step of forming a top tab coupler includes the step of forming a tab coupler hole. In some embodiments the step of the step of forming a top tab coupler includes the step of forming a tab coupler tooth. Step 210 of forming a shell top piece can include many other steps.

In some embodiments step 220 of forming a shell bottom piece from a rigid material further includes the step of forming a drink tube port in the shell bottom piece, where a drink tube of the fluid reservoir extends through the drink tube port. In some embodiments step 220 of forming a shell bottom piece from a rigid material further includes the step of forming two drink tube ports in the shell bottom piece, where a drink tube of the fluid reservoir extends through one of the two drink tube ports. In some embodiments the step of forming a drink tube port in the shell bottom piece includes the step of placing the drink tube port at a shell bottom piece top end. In some embodiments the step of forming a drink tube port in the shell bottom piece includes the step of placing two drink tube ports at a shell bottom piece top end opposite the fill port opening in the shell top piece. In some embodiments the step of forming a shell bottom piece includes the step of forming a pair of reinforcing ridges between the two drink tube ports in the shell bottom piece.

In some embodiments step 220 of forming a shell bottom piece includes the step of forming a v-groove along a portion of the perimeter of the shell bottom piece, where the v-groove mates with a v-tongue of the shell top piece. In some embodiments step 220 forming a shell bottom piece includes the step of forming a v-tongue along a portion of the perimeter of the shell bottom piece, where the v-tongue mates with a v-groove of the shell top piece. In some embodiments step 220 forming a shell bottom piece includes the step of forming a bottom tab coupler, where the bottom tab coupler couples with a top tab coupler of the shell top piece to couple the shell top piece to the shell bottom piece. In some embodiments the step of forming a bottom tab coupler includes the step of forming a tab coupler hole. In some embodiments the step of forming a bottom tab coupler includes the step of forming a tab coupler tooth. Step 220 of forming a shell top piece can include many other steps.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A method of forming a fluid reservoir shell comprising:
   forming a shell top piece of a rigid material, wherein the shell top piece comprises a fill port opening, and wherein a fluid reservoir couples to the shell top piece such that a fill port of the fluid reservoir protrudes from the fill port opening;
   forming a shell bottom piece of a rigid material, wherein the shell bottom piece couples to the shell top piece; wherein the shell top piece and the shell bottom piece enclose a bladder of the fluid reservoir in response to the fluid reservoir being coupled to the shell top piece and the shell bottom piece being coupled to the shell top piece;
   wherein the shell bottom piece comprises two drink tube ports, and wherein the two drink tube ports are placed at a shell bottom piece top end; and
   running a drink tube along an inside of the fluid reservoir shell from a shell bottom piece bottom end to one of the two drink tube ports, wherein the drink tube passes from the inside of the fluid reservoir shell to an exterior of the fluid reservoir shell through the one of the two drink tube ports.

2. The method of claim 1, wherein the shell bottom piece comprises a bottom tab coupler, wherein the bottom tab coupler comprises a tab coupler tooth.

3. The method of claim 2, wherein the shell top piece comprises:
   a top tab coupler, wherein the top tab coupler includes a tab coupler hole; and
   a tab coupler slot, wherein the tab coupler slot is configured to receive the bottom tab coupler;
   wherein the shell bottom piece couples to the shell top piece in response to the tab coupler slot receiving the bottom tab coupler and the tab coupler tooth extending into the tab coupler hole.

4. The method of claim 1 wherein:
   the shell top piece comprises a tongue running along a perimeter of the shell top piece;
   the shell bottom piece comprises a groove running along a perimeter of the shell bottom piece; and
   the tongue extends into the groove in response to the shell bottom piece being coupled to the shell top piece.

5. The method of claim 1, wherein the fluid reservoir couples to the shell top piece such that the fill port and a fill port cap of the fluid reservoir are accessible from an exterior of the fluid reservoir shell, and wherein the bladder is contained in an interior of the fluid reservoir shell.

6. A method of forming a fluid reservoir shell comprising:

forming a shell top piece of a rigid material, wherein the shell top piece comprises a fill port opening, and wherein a fluid reservoir couples to the shell top piece such that a fill port of the fluid reservoir protrudes from the fill port opening;

forming a shell bottom piece of a rigid material, wherein the shell bottom piece couples to the shell top piece, and wherein the shell top piece and the shell bottom piece enclose a bladder of the fluid reservoir in response to the fluid reservoir being coupled to the shell top piece and the shell bottom piece being coupled to the shell top piece;

wherein the shell bottom piece comprises two drink tube ports and wherein one of the two drink tube ports is placed at a shell bottom piece top end; and running a drink tube along an inside of the fluid reservoir shell from shell bottom piece bottom end to the one of the two drink tube ports located at the shell bottom piece top end, wherein the drink tube passes from the inside of the fluid reservoir shell to an exterior of the fluid reservoir shell through the one of the two drink tube ports.

7. The method of claim 6, wherein the shell bottom piece comprises a bottom tab coupler, wherein the bottom tab coupler comprises a tab coupler tooth.

8. The method of claim 7, wherein the shell top piece comprises:

a top tab coupler, wherein the top tab coupler includes a tab coupler hole; and a tab coupler slot, wherein the tab coupler slot is configured to receive the bottom tab coupler;

wherein the shell bottom piece couples to the shell top piece in response to the tab coupler slot receiving the bottom tab coupler and the tab coupler tooth extending into the tab coupler hole.

9. The method of claim 6 wherein:

the shell top piece comprises a tongue running along a perimeter of the shell top piece;

the shell bottom piece comprises a groove running along a perimeter of the shell bottom piece;

and the tongue extends into the groove in response to the shell bottom piece being coupled to the shell top piece.

10. The method of claim 6, wherein the fluid reservoir couples to the shell top piece such that the fill port and a fill port cap of the fluid reservoir are accessible from an exterior of the fluid reservoir shell, and wherein the bladder is contained in an interior of the fluid reservoir shell.

11. A method of forming a fluid reservoir shell comprising:

forming a shell top piece of a rigid material, wherein the shell top piece comprises a fill port opening, and wherein a fluid reservoir separably couples to the shell top piece such that a fill port of the fluid reservoir protrudes from the fill port opening;

forming a shell bottom piece of a rigid material, wherein the shell bottom piece separably couples to the shell top piece, wherein the shell top piece and the shell bottom piece enclose a bladder of the fluid reservoir in response to the fluid reservoir being coupled to the shell top piece and the shell bottom piece being coupled to the shell top piece;

wherein the shell bottom piece comprises two drink tube ports, wherein the two drink tube ports are located side by side and wherein the two drink tube ports are placed at a shell bottom piece top end; and running a drink tube along an inside of the fluid reservoir shell from a shell bottom piece bottom end to one of the two drink tube ports located at the shell bottom piece top end, wherein the drink tube passes from the inside of the fluid reservoir shell to an exterior of the fluid reservoir shell through the one of the two drink tube ports.

12. The method of claim 11, wherein:

the shell top piece comprises a tongue running along a perimeter of the shell top piece at least partially on all sides;

the shell bottom piece comprises a groove running along a perimeter of the shell bottom piece at least partially on all sides;

and the tongue extends into the groove in response to the shell bottom piece being coupled to the shell top piece.

13. The method of claim 11, wherein the shell bottom piece comprises a bottom tab coupler, wherein the bottom tab coupler comprises a tab coupler tooth.

14. The method of claim 13, wherein the shell top piece comprises:

a top tab coupler, wherein the top tab coupler includes a tab coupler hole;

and a tab coupler slot, wherein the tab coupler slot is configured to receive the bottom tab coupler;

wherein the shell bottom piece couples to the shell top piece in response to the tab coupler slot receiving the bottom tab coupler and the tab coupler tooth extending into the tab coupler hole.

15. The method of claim 11, wherein the fluid reservoir couples to the shell top piece such that the fill port and a fill port cap of the fluid reservoir are accessible from an exterior of the fluid reservoir shell, and wherein the bladder is contained in an interior of the fluid reservoir shell.

* * * * *